July 23, 1946.   L. O. REICHELT ET AL   2,404,529
VALVE
Filed May 12, 1943   3 Sheets-Sheet 1
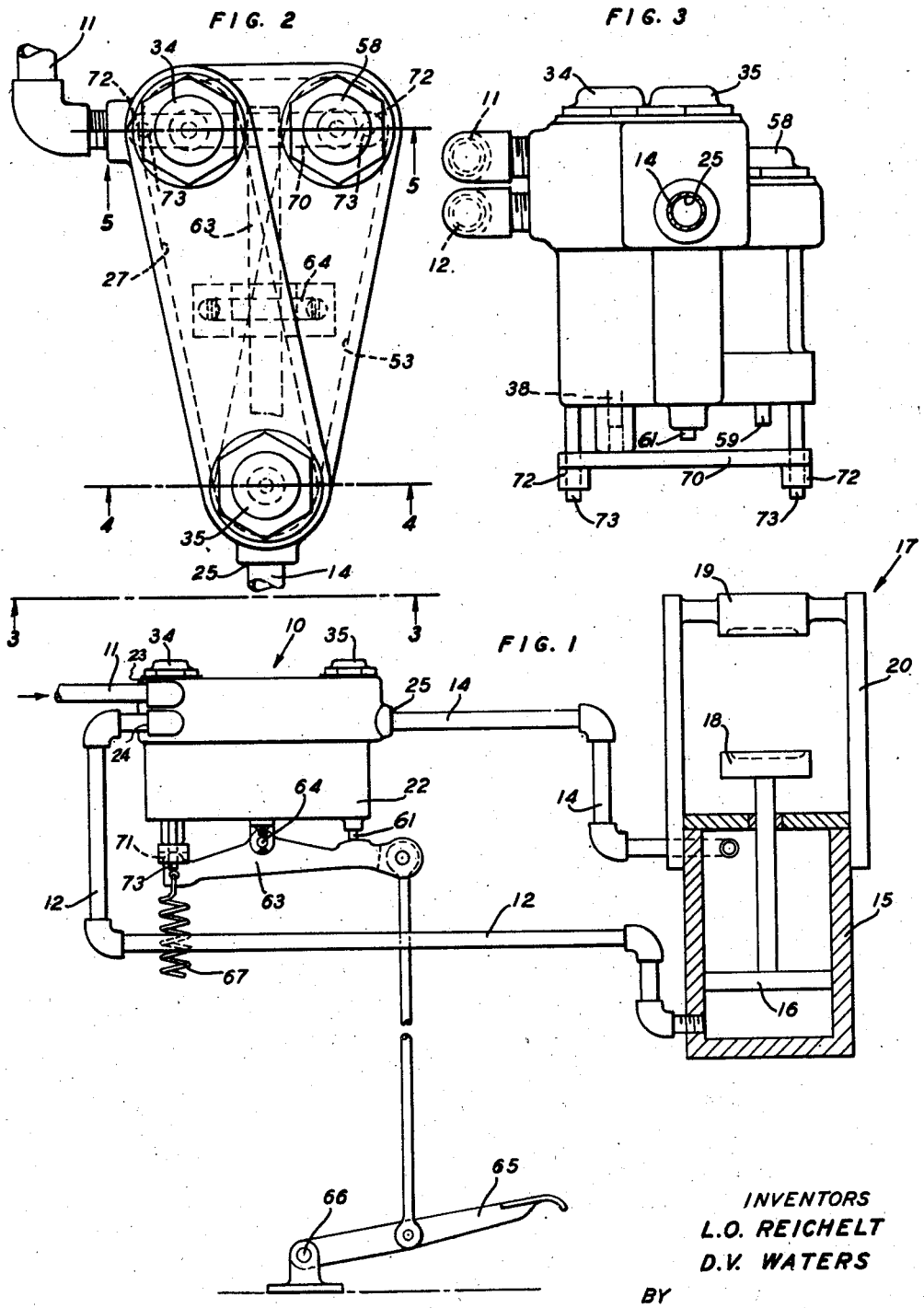
INVENTORS
L.O. REICHELT
D.V. WATERS
BY
E.R. Noulan
ATTORNEY

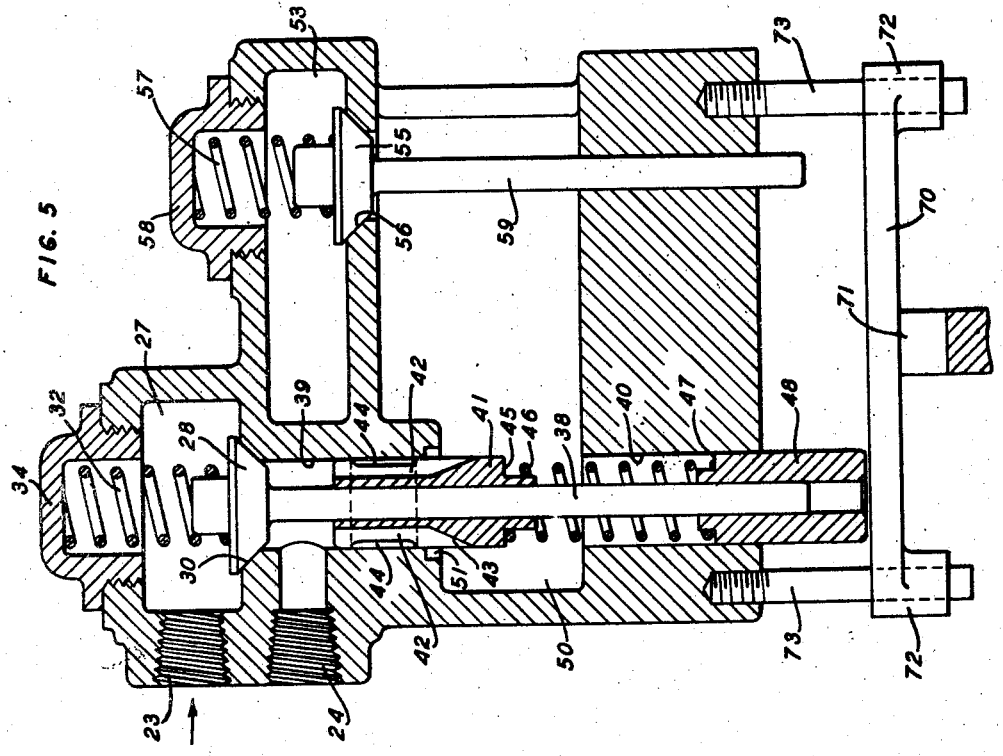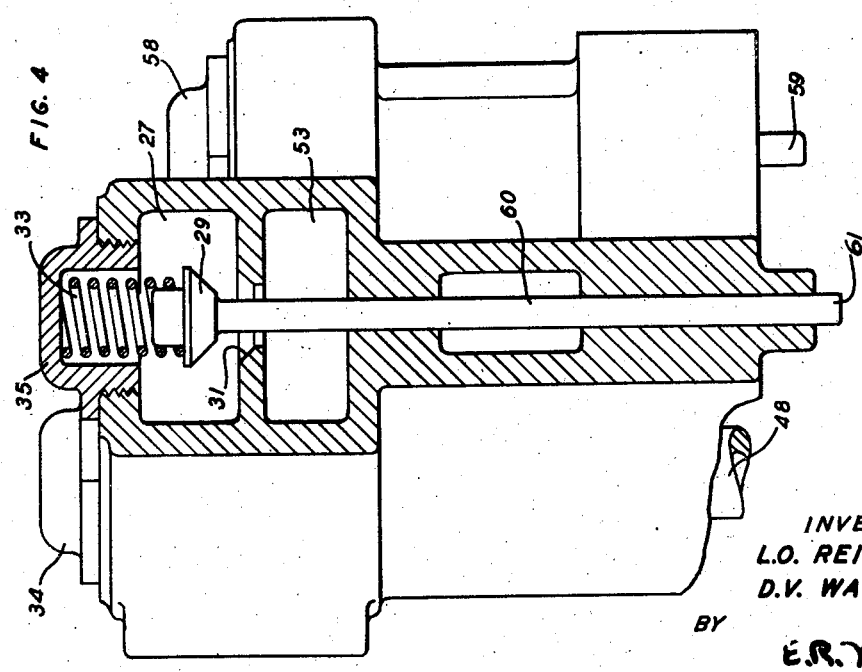
INVENTORS
L.O. REICHELT
D.V. WATERS
BY
E.R. Nowlan
ATTORNEY

July 23, 1946.　　　L. O. REICHELT ET AL　　　2,404,529
VALVE
Filed May 12, 1943　　　3 Sheets-Sheet 3
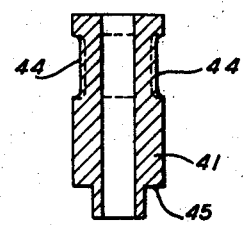
FIG. 6
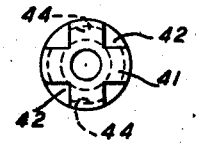
FIG. 7
FIG. 8
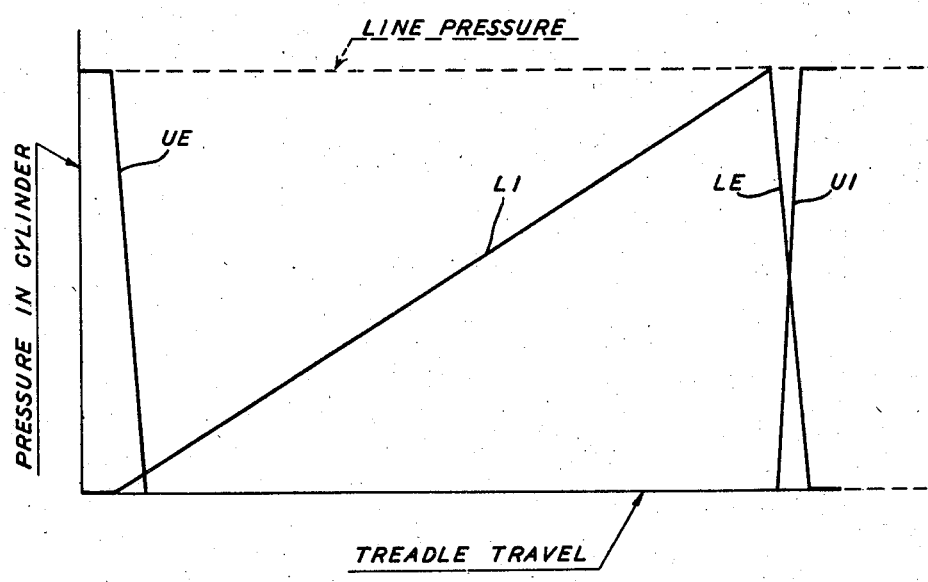
INVENTORS
L.O. REICHELT
D.V. WATERS
BY E.R. Moculan
ATTORNEY Patented July 23, 1946

2,404,529

UNITED STATES PATENT OFFICE 2,404,529

VALVE

Lester O. Reichelt, Cranford, and Daniel Vaughn Waters, Flemington, N. J., assignors to Western Electric Company, Incorporated, New York, N. Y., a corporation of New York Application May 12, 1943, Serial No. 486,640

1 Claim. (Cl. 121—46.5)

This invention relates to valves, and more particularly controlling apparatus for fluid operated machines.

During the operation of certain types of machines, it has been found desirable ofttimes to be able to apply varied forces to the material working parts of the machine and/or to cause their movement into operative positions at varied speeds. When the control of such machines lies in a manually actuable fluid control apparatus, it has been found advantageous to equip the apparatus with means so that, through it, these variations may be brought about.

An object of the invention is to provide a fluid controlling apparatus which is simple in construction yet highly efficient for actuation in controlling the operation of a machine.

With this and other objects in view, the invention comprises a fluid control apparatus having a housing with fluid chambers therein, in one of which a pair of supply valves is disposed, an exhaust valve being disposed in the other, and means to control the supply and exhaust valves for alternately supplying a fluid under pressure to opposite sides of an operating piston, one of the supply valves having an associate control to vary the pressure of the fluid directed to its respective side of the piston.

Other objects and advantages will be apparent from the following detailed description when considered in conjunction with the accompanying drawings, wherein Fig. 1 is a side elevational view of the apparatus shown connected to a machine, the operation of which the apparatus is to control;

Fig. 2 is a top plan view of the apparatus;

Fig. 3 is an end elevational view of the apparatus, this view being taken along the line 3—3 of Fig. 2;

Fig. 4 is an enlarged vertical sectional view taken along the line 4—4 of Fig. 2;

Fig. 5 is an enlarged vertical sectional view taken along the line 5—5 of Fig. 2;

Fig. 6 is a vertical sectional view of a part of the fluid control means of one of the supply valves;

Fig. 7 is a top plan view of the structure shown in Fig. 6, and

Fig. 8 is a graph showing variations in pressure at opposite sides of the piston through the control of the apparatus.

Referring now to the drawings, attention is first directed to Fig. 1, which illustrates the apparatus, indicated generally at 10, connected to a fluid supply line 11 and having fluid lines 12 and 14 extending to and communicating with the operative and return portions of a cylinder 15 below and above a piston 16. Although the apparatus has been designed to control air under pressure to the cylinder, it would function equally well with other fluids such as oil, water and the like. The cylinder and piston are part of a schematically illustrated machine, indicated generally at 17, which includes a die 18 movable with the piston relative to its companion die 19 which is supported by suitable means 20.

The apparatus 10 has a housing 22 threadedly apertured at 23, 24 and 25 for the connection of the supply line 11 and the fluid lines 12 and 14 respectively. By viewing Fig. 5, it will be apparent that the supply line 11, or the threaded aperture therefor, leads into a chamber 27, this chamber extending lengthwise of the housing as illustrated in Fig. 2. Communicating with the chamber 27 are two control valves 28 and 29 which may be respectively termed operating and return valves, as they will control the flow of the fluid to move the die 18 through the action of the piston 16 respectively into the operating position and the return or normal position. These valves are normally urged downwardly into engagement with their seats or apertures 30 and 31 by their respective springs 32 and 33. Threaded caps or covers 34 and 35 are disposed in threaded apertures of the housing in alignment with their respective valves 28 and 29, to function as abutting supports for their springs and to provide access to the valves.

The valve 28 has a stem 38 projecting downwardly through apertures 39 and 40 in the housing to a given position beneath the housing, as shown in Fig. 5. Concentric with the valve stem 38 is a control element or metering valve 41, which is cylindrical in general contour for slidable movement in the aperture 39 and has circumferentially spaced V-grooves 42 in its periphery extending from the upper end thereof to positions at approximately the center of the element, at which positions the grooves taper outwardly, as indicated at 43, to the cylindrical periphery of the element at these points. The portions of the element between the grooves 42 in the upper half of the element are recessed, as at 44, to allow for the free passage of the fluid under pressure completely around the element at this portion. The lower end of the element 41 has a shoulder 45 to receive the upper end of a spring 46, the lower end of which rests upon a shoulder 47 of a tubular member 48, the latter being disposed in the aperture 40 concentric with the valve stem 38.

At this time attention is directed to a hollow portion 50 of the housing which is open to the atmosphere, the aperture 39 communicating with this open portion. The threaded aperture 24, to which the fluid line 12 is connected, communicates with the aperture 39 and through it with the chamber 27 and the atmosphere at the open portion 50, depending upon the control of the valve 28 and the element 41. Also, at the bottom of the aperture 39 an annular recess 51 is formed in the housing about the element 41.

Attention is now directed to the valve 29, which, as illustrated in Fig. 4, is disposed in the chamber 27 and controls the fluid under pressure from the chamber 27 to a chamber 53. The chamber 53 extends longitudinally of the housing 22, as illustrated in Fig. 2, affording communication between the chamber 27 at the valve 29 and the threaded aperture 25 to which the fluid line 14 is connected. In the chamber 53 an exhaust valve 55 is disposed, normally held on its seat or aperture 56 by a spring 57 positioned in a cap 58 threadedly disposed in an aperture of the housing as illustrated in Fig. 5. The valve 55 is adapted to open the chamber 53 to the atmosphere through the open portion 50 of the housing. A stem 59 for the valve 55 extends downwardly through the housing to a position, as illustrated in Fig. 5, in a plane with the lower end of the valve stem 38. A valve stem 60 for the valve 29 extends downwardly through the housing to a position indicated at 61, at a different level from that of the lower ends of the valve stems 38 and 59.

The means for actuating the valves through contact with their valve stems is illustrated in Figs. 1, 3 and 5, and includes a lever 63 pivotally supported at 64 and actuable through a treadle 65, pivoted at 66, against the force of a spring 67, the latter normally urging the lever into the position shown in Fig. 1, to actuate the valve 29 and hold it in its open position shown in Fig. 4. In this position the valves 28 and 55 remain closed and the valve 41 open as illustrated in Fig. 5. To assist the lever 63 in operating the valves 28 and 55, a cross piece or element 70 has its central portion lying upon a rounded end 71 of the lever 63, its ends being provided with bearing portion 72 for movement on guide rods 73 which, through the bearings, assure maintenance of the element in a true horizontal position at all times during its movement. The element 70 is disposed for engagement with the tubular member 48 and the valve stems 38 and 59.

Upon considering the operation of the valve in conjunction with the apparatus 17, let it be assumed that the valve and apparatus are in the normal position shown in Fig. 1. In this position the valve 29 is open and fluid under pressure is free to pass from line 11 through chamber 27, aperture 31 opened by the valve 29, chamber 53, and fluid line 14, to the upper portion of the cylinder 15. This fluid pressure causes downward movement of the piston 16, to move the die 18 away from its companion die 19.

To move the dies into closed position, that is the die 18 relative to the die 19, the treadle or control element 65 is moved about its pivot 66, and as a result lever 63 is moved about its pivot 64 against the force of the spring 67. During the movement of the lever 63, the valve 29 is released and allowed to be closed by its spring 33. At the same time the tubular member 48, through its engagement with the element 70, is moved upwardly and with it is moved the spring 46 and the control element 41. This movement of the elements 48 and 41 and the connecting spring 46 continues to cause the solid lower portion of the element 41 to substantially close the aperture 39 before the valve 28 is opened. When the element 70 is moved a sufficient distance to engage the lower ends of the valve stems 38 and 59, it is in a position to open the valves 28 and 55 against the force of their springs 32 and 57. The opening of the valve 55 provides an exhausting means for the upper portion of the cylinder 15 through the line 14, the chamber 53, and into the atmosphere through the aperture 56 opened by the valve 55 at the hollow portion 50. However, prior to the opening of the exhaust valve 55 the valve 29 will be closed by the aforementioned action of the treadle and lever.

The moment the valve 28 is moved into open position, fluid under a given pressure from the supply line 11 and in the chamber 27 may pass into the aperture 39 and a portion of this fluid may be directed to the lower portion of the cylinder 15, that is beneath the piston 16, through the fluid line 12. The fluid under pressure entering the aperture 39 and filling the fluid line 12 and the portion of the cylinder beneath the piston 16, will build up a pressure depending upon the holding force of the element 41. This force will be applied against the force of the spring 46 and if the force of the fluid is greater than that of the spring, the element 41 will be moved downwardly until these forces are balanced, at which time the grooves 42 in the element 41 may extend out of the aperture 39 and allow a portion of the fluid to escape. Thus it will be apparent that the position of the treadle, and in a like manner the position of the lever 63, governs the pressure of the fluid applied to the piston 16. The pressure at the piston may be increased or varied with increased pressure or variation of pressure on the treadle 65. Thus a gradual downward movement of the treadle will cause a gradual increase in the force of the spring 46 through the continued upward movement of the member 48, effecting an increase in the force of the fluid passing to the cylinder beneath the piston. During this movement of the treadle and the member 48, the spring 46 tends to force the control element 41 upwardly into the aperture 39, to decrease the size of the outlet portions at the grooves 42 and thus decrease the amount of fluid allowed to escape. Through continued movement of the treadle 65, added force will be established in the spring 46 until his force is greater than the line or supply pressure of the fluid, at which time the full force of the fluid will be applied to the piston. It will, therefore, be apparent that the apparatus may be moved into closed position under variable pressures or under a constantly increasing pressure, such being under the complete control of the treadle.

The action of the piston 16 under this force may be illustrated by the graph shown in Fig. 8. The (left) vertical line represents pressure in the cylinder, the lower horizontal line represents the treadle position or the position of the lever 63 relative to its valve stems and the upper dotted line represents line pressure or the full pressure of the fluid from the supply line 11. Thus starting at zero with the treadle in its normal position, the line marked (LI), lower intake, indicates the effect of a gradual depression of the treadle the full distance. In other words, after a short movement of the treadle the fluid pressure beneath the piston will gradually increase over a given period of time, that determined by the travel of the treadle until the pressure beneath the piston has increased from zero to the full line zero.

The line marked UE, upper exhaust, indicates the pressure in the cylinder above the piston. It will, therefore, be apparent, by this line UE, that the upper cylinder end has full line pressure of the fluid therein prior to the actuation of the treadle or during the normal position thereof. After a given movement of the treadle, as indicated by the horizontal portion of this line, the valve 55 will be opened, the valve 29 being closed, allowing escapement of the fluid from the upper cylinder end into the atmosphere. The time interval for exhausting the upper cylinder end is short, as indicated by the said line UE.

The lines UI and LE represent the upper intake and lower exhaust under the control of the valve. The return movement of the piston 16 is more rapid than its feeding movement, as illustrated by the lower exhaust line LE coupled with the intake line LI and comparable with the upper intake UI for the upper cylinder end. In each instance there is free uninterrupted passage for the fluid entering the upper end of the cylinder through the opening of the valve 29 and the exhausting of the fluid from lower end of the cylinder through the closing of the valve 28, effecting opening of the aperture or passageway 39 for the exhausting of the fluid into the atmosphere through the grooves 42 in the element 41. In this manner the element 41, through its grooves, serves as an exhausting means during this portion of the operation of the valve structure and serves as a pressure control means during the opening of its valve 28. As a result of the valve structure, the operating portions of the apparatus may be returned as rapidly as desired, their movement into operating positions, however, being controlled through the speed of travel of the treadle or its associated lever. It should be understood, also, that the stopping of the movement of the treadle at varied positions will result in the application of varied pressures operating the apparatus. It may not be necessary, in certain instances, to apply full line pressure to the piston. In such instances the desired pressure may be applied by limiting the position of the treadle.

Although specific improvements of the invention have been shown and described, it will be understood that they are but illustrative and that various modifications may be made therein without departing from the scope and spirit of this invention as defined by the appended claim.

What is claimed is:

A fluid control apparatus comprising a housing having an inlet port and an outlet port with a connecting passageway therebetween having an outlet end opening to the atmosphere adjacent the outlet port, a valve normally closing the passageway between the ports and having a stem extending through the said outlet end of the passageway, a supply line for a fluid under pressure connected to the inlet port, a fluid line connected to the outlet port, a member movable under varied forces to engage the stem and open the valve to open the passageway between the ports, an element movably disposed in the passageway concentric with the stem and formed to close the outlet end of the passageway when in one position to cause the fluid under its full pressure to pass into the fluid line and to provide an opening varying in size with variations in the position of the element in the passageway to cause varied quantities of the fluid to escape through the said exit end and thereby vary the force of the fluid in the fluid line, and resilient means to apply varied forces to the element to vary the position thereof in the passageway.

LESTER O. REICHELT.
DANIEL VAUGHN WATERS.